(12) United States Patent
Travison et al.

(10) Patent No.: US 6,868,539 B1
(45) Date of Patent: Mar. 15, 2005

(54) SYSTEM AND METHOD PROVIDING SINGLE APPLICATION IMAGE

(75) Inventors: Daniel T. Travison, Carnation, WA (US); Kent S. Schliiter, Seattle, WA (US); Martin J. Sleeman, Redmond, WA (US); Lara N. Dillingham, Seattle, WA (US); Boyd C. Multerer, Seattle, WA (US); Roger W. Sprague, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 631 days.

(21) Appl. No.: 09/873,718

(22) Filed: Jun. 4, 2001

Related U.S. Application Data

(63) Continuation-in-part of application No. 09/714,568, filed on Nov. 16, 2000, and a continuation-in-part of application No. 09/606,383, filed on Jun. 28, 2000.
(60) Provisional application No. 60/231,874, filed on Sep. 12, 2000.

(51) Int. Cl.[7] ................................................ G06F 9/45
(52) U.S. Cl. .................................................... 717/100
(58) Field of Search ........................... 717/100; 705/51

(56) References Cited

U.S. PATENT DOCUMENTS

| | | | | |
|---|---|---|---|---|
| 6,064,666 A | | 5/2000 | Willner et al. ............... 370/352 |
| 6,578,069 B1 | * | 6/2003 | Hopmann et al. ........... 709/203 |
| 6,643,555 B1 | * | 11/2003 | Eller et al. .................... 700/83 |
| 6,701,453 B2 | * | 3/2004 | Chrabaszcz .................. 714/13 |
| 2001/0037302 A1 | * | 11/2001 | McFadzean et al. .......... 705/51 |
| 2002/0156866 A1 | * | 10/2002 | Schneider ................... 709/218 |

* cited by examiner

*Primary Examiner*—John Chavis
(74) *Attorney, Agent, or Firm*—Amin & Turocy, LLP

(57) ABSTRACT

A system and method is provided that facilitates the administration of an application in accordance with the present invention. The system includes a resource identifier that identifies resources associated with the application and a manifest that logs the resources. An aggregator is provided that aggregates a subset of the resources into the manifest to facilitate administration of the application. The aggregator can be provided by a user interface and/or an automated builder. A graphical user interface is also provided to facilitate deployment, creation and enumeration of the application.

43 Claims, 17 Drawing Sheets

410

Deployment Target Options
    Enter a name for this deployment and select its type.

Source server:

Deployment name: [                    ]

⦿ Deploy content inside the current cluster
    Deploy content to one or more cluster members within the current cluster.

○ Deploy content outside the current cluster
    Deploy content to one or more Application Center clusters or members outside the current cluster.

412

Deployment Source Authentication
    Enter credentials with administrative privileges for the source server.

Source:

User name: [                    ]

Password: [                    ]

Domain: [                    ]

Fig. 11

Deployment Target Authentication — 414

Enter credentials with administrative privileges for all deployment targets.

This account will be used for authentication on all targets in this deployment.

User name: [            ]
Password: [            ]
Domain: [            ]

---

Deployment Targets Within the Cluster — 416

Select one or more cluster members.

To deploy to the entire cluster, select the controller. To deploy to one or more members, select each member. COM+ applications and ISAPI filters must be deployed manually throughout the cluster.

Targets: — 418
- Server member 1
- Server controller 3
- Server member 7

Fig. 12

Deployment Targets
Enter one or more deployment targets.

To deploy to an entire cluster, enter the controller name. To deploy to a specific member, enter the member name. COM+ applications and ISAPI filters must be deployed manually throughout the cluster.

Target:

[_____] [Browse]

- Server member 1
- Server controller 3
- Server member 7

[Add...]
[Remove]

— 420

Deployment Content
Select the content for this deployment.

⦿ Deploy all applications and related cluster configuration
○ Deploy one or more applications:

- Accounts Payable Application
- HR Tracking Application
- My Web Application

— 424
— 426

Deployment Options
Select deployment options.

☑ Deploy folder and file permissions (NTFS only)
Deploying folder and file permissions will overwrite folder and file permissions on the target.

☐ Deploy COM+ applications
Deploying COM+ applications will reset Internet Information Services (IIS) and any other related services on the target.

☐ Deploy global ISAPI filters
Deploying ISAPI filters will reset Internet Information Services (IIS) on the target.

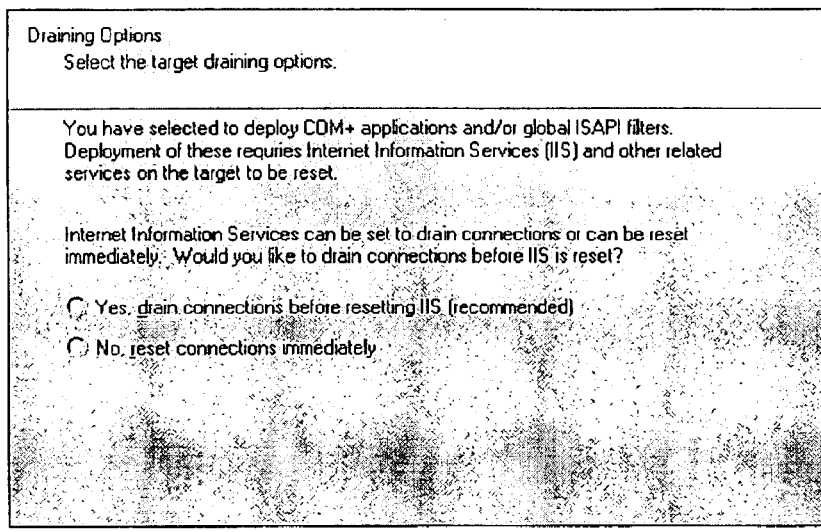
Fig. 14

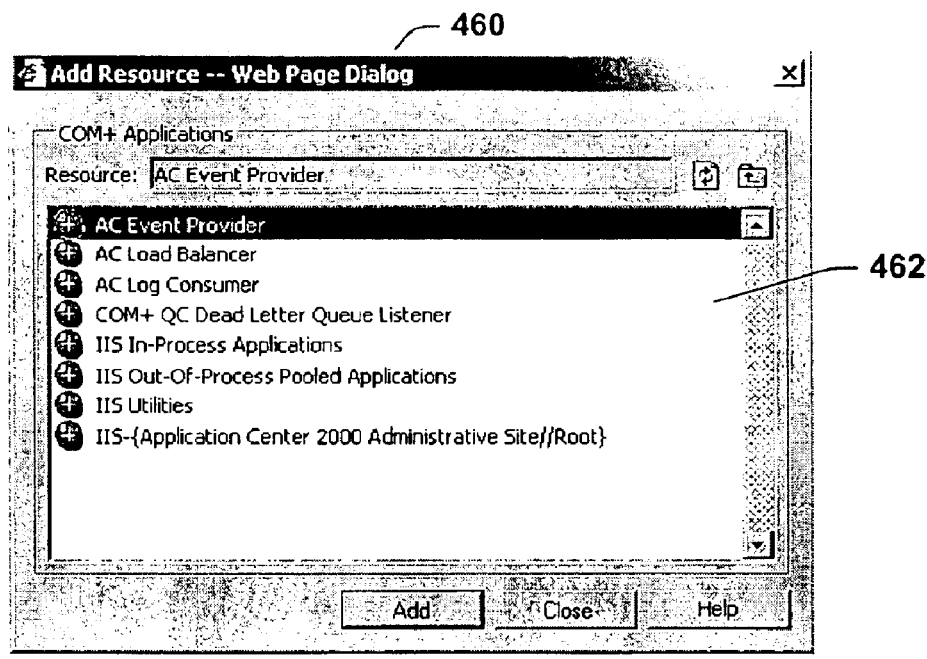
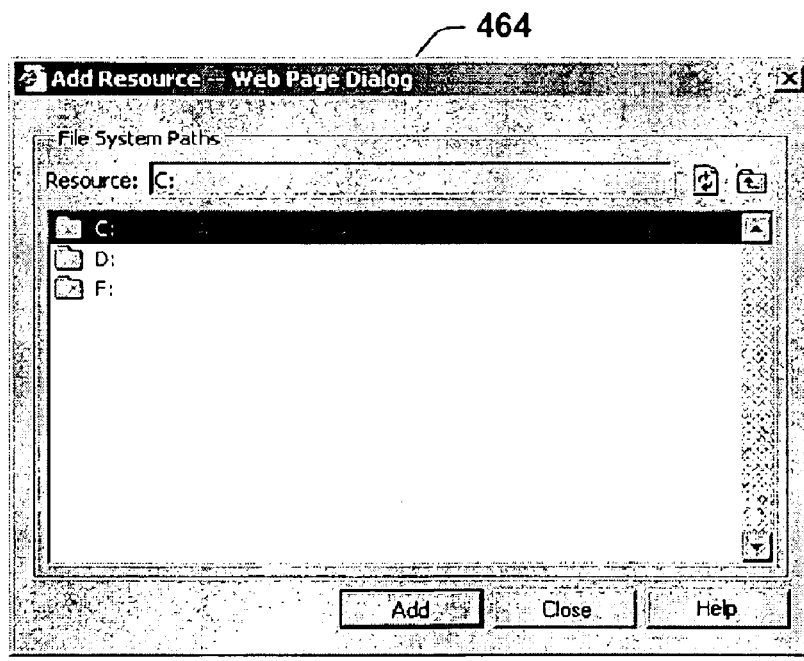
Fig. 16

SYSTEM AND METHOD PROVIDING SINGLE APPLICATION IMAGE

REFERENCE TO RELATED APPLICATION

This application is a continuation in part of U.S. patent application Ser. No. 09/606,383, which was filed Jun. 28, 2000, entitled USER INTERFACE TO DISPLAY AND MANAGE AN ENTITY AND ASSOCIATED RESOURCES, and is a continuation in part of U.S. patent application Ser. No. 09/714,568, which was filed Nov. 16, 2000, entitled SYSTEM AND METHOD PROVIDING VIRTUAL APPLICATIONS ARCHITECTURE which claims the benefit of U.S. Provisional Patent Application Ser. No. 60/231,874, which was filed Sep. 12, 2000, entitled SYSTEM AND METHOD PROVIDING VIRTUAL APPLICATIONS ARCHITECTURE.

TECHNICAL FIELD

The present invention relates generally to computer systems, and more particularly to a system and method that facilitates administration of a plurality of various and disparate resources associated with an application via a singular application image.

BACKGROUND OF THE INVENTION

With the advent of the Internet and other applications, computing system requirements and demands have increased dramatically. Many businesses, for example, have made important investments relating to Internet technology to support growing electronic businesses such as E-Commerce and other Internet related activities. In view of this and other considerations, hardware and software systems generally have become more complex in order to facilitate serving desired computational and/or network load requirements.

Today's web-based applications, for example, consist of many different types of resources providing various aspects of these systems. Managing these applications is a problematic and error prone endeavor, however. Since the resources often are dependent upon each other, it is important for an administrator to maintain the proper versions of the resources relative to each other when interacting with these applications. In addition to "versioning", there is an affinity and a dependence wherein, one file relies on a completely separate file, for example. Consequently, this is time-consuming and inefficient since clearly defining and maintaining an application generally requires knowledge of all resources associated with the application. Similarly, communications involving the application generally requires communication and knowledge of all components and/or resources of the application (e.g., for each and every person who interacts with the application at an administrative level).

During the development of an application, it is thus difficult to maintain knowledge of the components that make up the application. For example, currently there generally are no efficient tools or technologies for the definition and/or maintenance of the resources that make up an application. In addition, moving and/or copying of the application is problematic and error prone as it requires the administrator to be aware of all the various parts that make up the application. Monitoring an application is also problematic since it generally requires separate monitoring of the various portions of the application. Furthermore, performing various administrative tasks, such as, versioning, deployment, rolling back, and scheduling tasks, for example, along with other issues, is problematic and also error prone since, these tasks generally operate on each resource individually.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology providing a singular application image from a collection of disparate resources associated with an application. As an example, many Web-based and/or other applications consist of a plurality of different types of resources that collectively contribute to the overall functionality of the application. These recourses often are distributed in various directories, memory locations, and files, as well as system configurations and/or other images, for example, within a computer system or distributed computing system. The singular application image of the present invention mitigates the time and complexity involved with administration of the resources as individual components (e.g., replication, monitoring, upgrading), as well as providing other aspects such as enabling application extensibility, for example.

In accordance with the present invention, a manifest is provided wherein 1 to N resources, N being an integer, are identified within a singular application image. The resources can be identified by resource identifiers associated with the respective resources within the manifest, wherein the singular application image includes an identifier such as a Globally Unique Identifier (GUID) to maintain the singular application identity. In this manner, administrative tasks can be performed on the singular application, thus mitigating the need for knowledge or direct manipulation of the resources that define the application. Other aspects of the invention include monitoring, versioning and staging of the singular application along with providing deployment, extensibility, and policy management capabilities. According to another aspect of the present invention, a Graphical User Interface (GUI) is provided for creation, enumeration, administration, management and deployment of the singular application image.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIGS. 10–14 is a graphical user interface illustrating deployment of a singular application image in accordance with an aspect of the present invention.

FIG. 16 is a graphical user interface illustrating enumeration, creation and editing of a singular application image in accordance with an aspect of the present invention.

DETAILED DESCRIPTION OF THE INVENTION

The present invention relates to a system and methodology for aggregating various resources associated with an application into a single application image. This enables administrators to utilize the single application image as a modular and identifiable entity after the image has been defined and thus, mitigates the costs associated with management and deployment of these applications, for example. This is due in part to a reduced need of specialized knowledge for people working with the application at an administrative level, and reduces the potential for error. This also enables more robust visualization of the state of the applications and makes possible hi-level abstractions of the applications via the single application image. It is noted that the present invention is not limited to web-based applications. Substantially any set of resources that depend from other respective resources to function collectively as an application can be logically grouped into the single application image of the present invention.

By creating the single application image, it is generally not necessary for people working with this image to necessarily know of its contents. Therefore, it is not only easier for people working with the application, but other systems can "plug in" and utilize the knowledge of the single application image. Thus, the image can be utilized as a logical and functional unit. A system executing the single application image can perform administrative tasks on the application as a whole without requiring knowledge or direct manipulation of the components that define the application. The system enumerates and combines various resources into an application manifest maintained by the system, F wherein Metadata if desired, can be maintained by the system on the application manifest. Moreover, applications can be maintained indefinitely or expired after a predetermined amount of time, automatically by the system.

Figure 1:
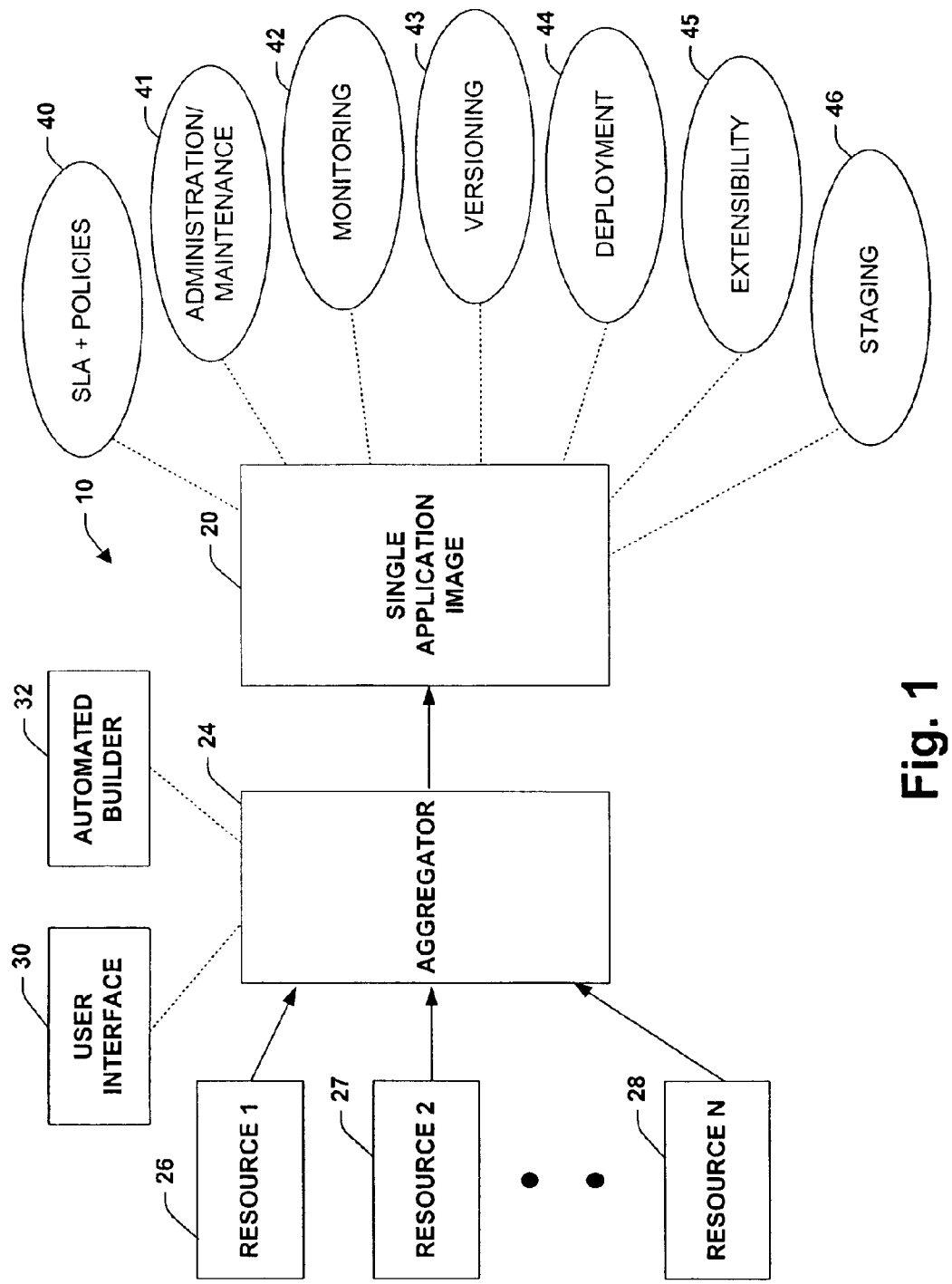
FIG. 1 is a schematic block diagram illustrating a singular application image in accordance with an aspect of the present invention.

Referring initially to FIG. 1, a system 10 illustrates a singular application image 20 in accordance with an aspect of the present invention. An aggregator 24 identifies and/or collects one or more resources 26–28 associated with an application and aggregates or combines the resources 2628 into the single application image 20. The resources 26–28 can include substantially any resource associated with the application. For example, these resources can include data structures, configuration/registry settings, files, directories, directory substructures, pointers, identifiers to other resources and/or images such as DLL and EXE images, objects (e.g., COM/CORBA) and can include actual executable code images. Other resources can include Internet Information Services (IIS) configuration settings (e.g., Metabase nodes). Another resource example includes an IIS configuration that can include Certificates that are also part of the application. As will be described in more detail below, the aggregator 24 can include a user interface 30 and/or an automated builder 32 to create the single application image 20 from the resources 26–28.

By combining various resources 26–28 into the single application image 20, many advantages are achieved over conventional systems that operate upon application resources as separate components. According to one aspect of the present invention, service level agreements (SLA) and/or other polices 40 can be included with the single application image 20 to control lifetime, deployment, staging, and operating bandwidth capabilities of the image. Administration and/or maintenance 41 is facilitated since the single application image 20 can be referenced, moved, copied, and replicated, for example, as a logical unit, wherein the relationship between the components/resources of the application are maintained within the image 20. These relationships can include flat and/or hierarchical relationships between resources across directories, systems, and/or across distributed computing environments such as a network of related entities.

One or more monitors 42 can be included with the single application image 20 to facilitate administering, viewing, enumerating and troubleshooting the resources 26–28 of the related application. In addition, the single application image 20 promotes versioning 43 since the identity of the application as defined by the collective resources 26–28 is maintained as a unit/package by the image 20 for the lifetime of the associated application. Thus, if a resource 26–28 within the single application image 20 were to be updated, changed or altered, the image 20 can still be identified as a logical unit without having to consider the other pieces and/or components of the unit.

Since the single application image 20 includes the related resources 26–28 of an application and the logical relationships between the resources and associated execution environment, deployment 44 of the image 20 is facilitated. For example, the single application image 20 can be replicated from one system to another, wherein associated references within the image 20 between resources can interact with other resource references in a similar manner as when located on the previous system. As will be described in more detail below, the present invention also provides extensibility 45 and staging 46 aspects that includes extending existing applications with additional components, and bundling/creating one or more single application images from various combinations of resources 26–28 on a staging system and deploying the one or more created images to other entities.

Figure 2:
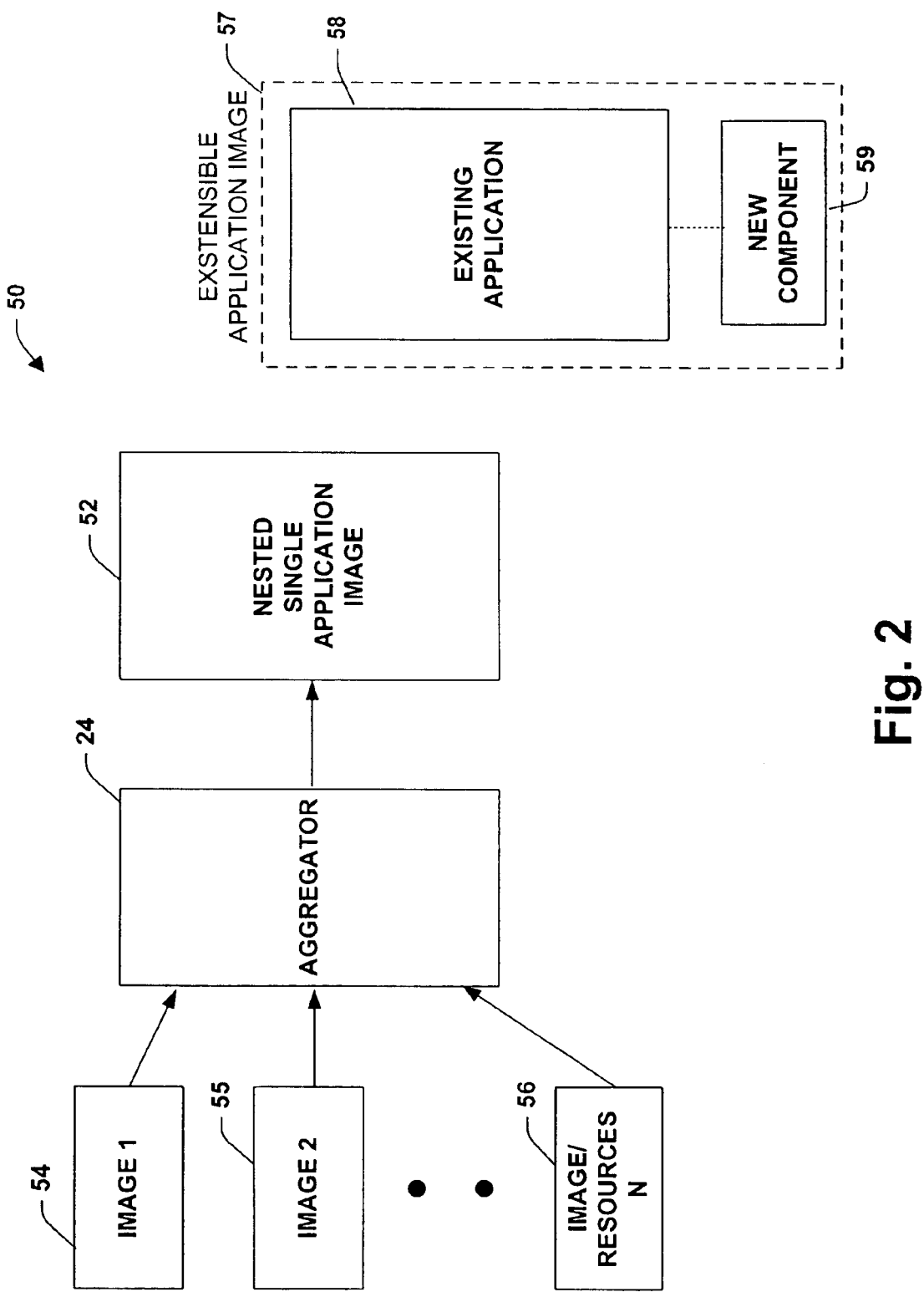
FIG. 2 is a schematic block diagram illustrating a nested application image and application extensibility in accordance with an aspect of the present invention.

Referring now to FIG. 2, a system 50 illustrates the creation of nested and extensible applications according to another aspect of the present invention. A nested application image 52 can be created by the aggregator 24, wherein the nested image 52 is a combination of one or more other single application images depicted as images 54–56. It is noted that the nested application image 52 can also include one or more resources as previously described. In a similar manner, an extensible application image 57 can also be created in accordance with the present invention. For example, an existing application 58 (e.g., word processor, spreadsheet, web, COM, etc.) can be extended by the addition of one or more new components 59 within the image 57. As an example, a developer could add a help or other type utility as the new component 59, wherein the existing application could then utilize the new utility, yet both components 58 and 59 can be operated upon as a single logical unit after creation of the image 57. Thus, the image 57 can be manipulated and managed as if a singular entity.

Figure 3:
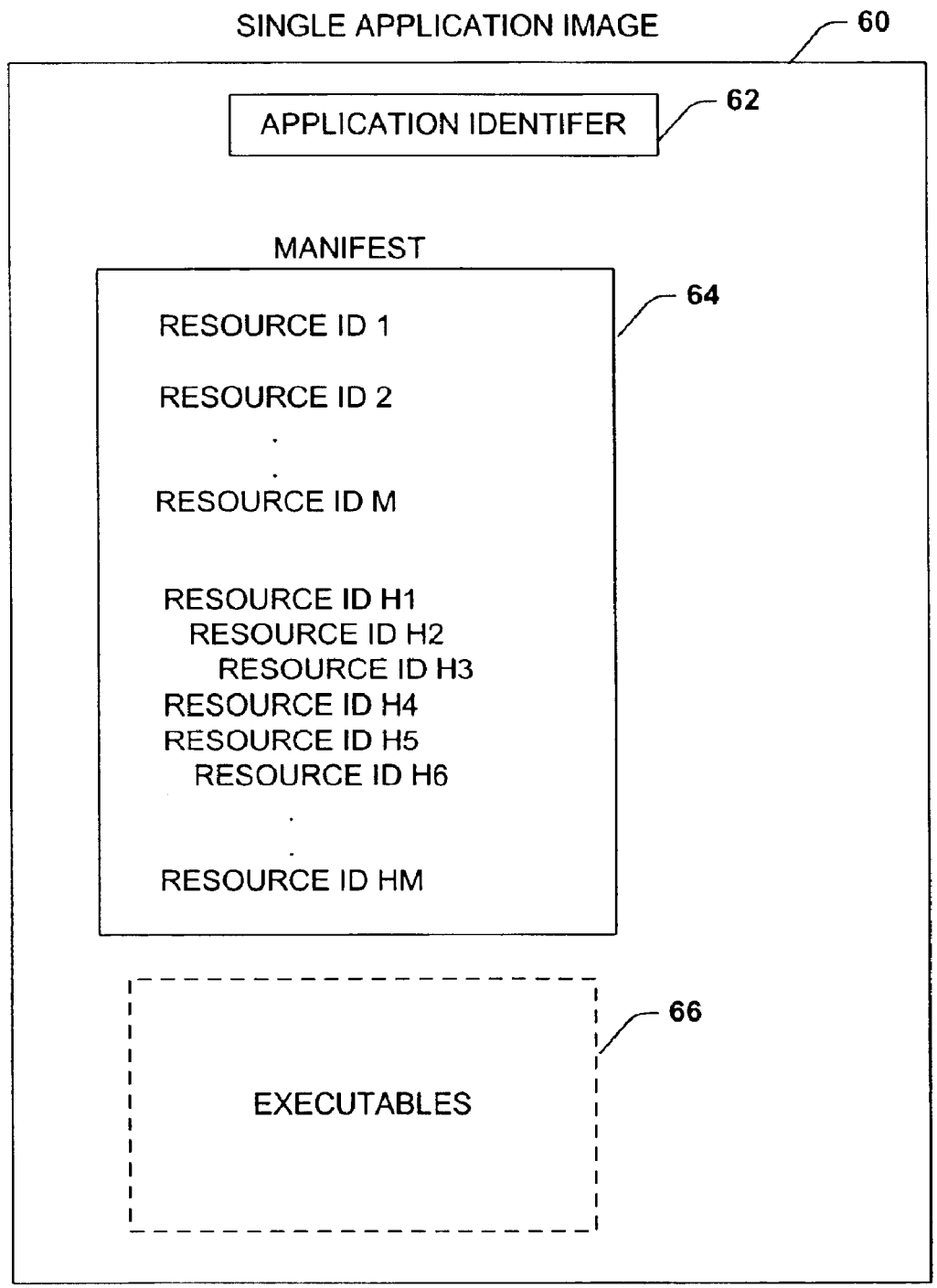
FIG. 3 is a diagram illustrating a more detailed singular application image in accordance with an aspect of the present invention.

Turning to FIG. 3, a singular application image 60, also referred to as the image 60, is illustrated in more detail in accordance with the present invention. The image 60 can include an application identifier 62 such as a globally unique identifier (GUID). It is noted that substantially any type of identifier and/or code that provides differentiation from other images may be similarly employed. The image 60 can also include a manifest 64 that includes one or more resource identifiers (IDs) that act as an index and/or pointers to actual resources. As illustrated, Resource IDs 1 though M may be included that are referenced to each other in a similar file structure such as a directory or subdirectory. Resource IDs H1 through HM are arranged and referenced to each other in a hierarchical manner, wherein some of the resources may be located in different directories/subdirectories and/or located in a different hardware platform. For example, resource ID H2 is subordinate to resource H1, wherein resource H3 is subordinate to resource H2. As described above, the resources may include files, configuration data, references, monitors that are bound to the manifest 64, file exclusions and/or resource mappings. It is noted that the resource IDs provide mappings from the associated resources to executable and/or hardware portions within a computing and/or distributed computing environment and can include mappings to other resources. As illustrated, the image 60 can also include other resources such as executable images 66 (e.g., EXE, DLL's, binaries). It is noted that the executable images 66 are but one particular example of a specific resource type that can be located and/or hierarchically arranged in the image 60 along with other resources (not shown) such as files, for example.

Figure 4:
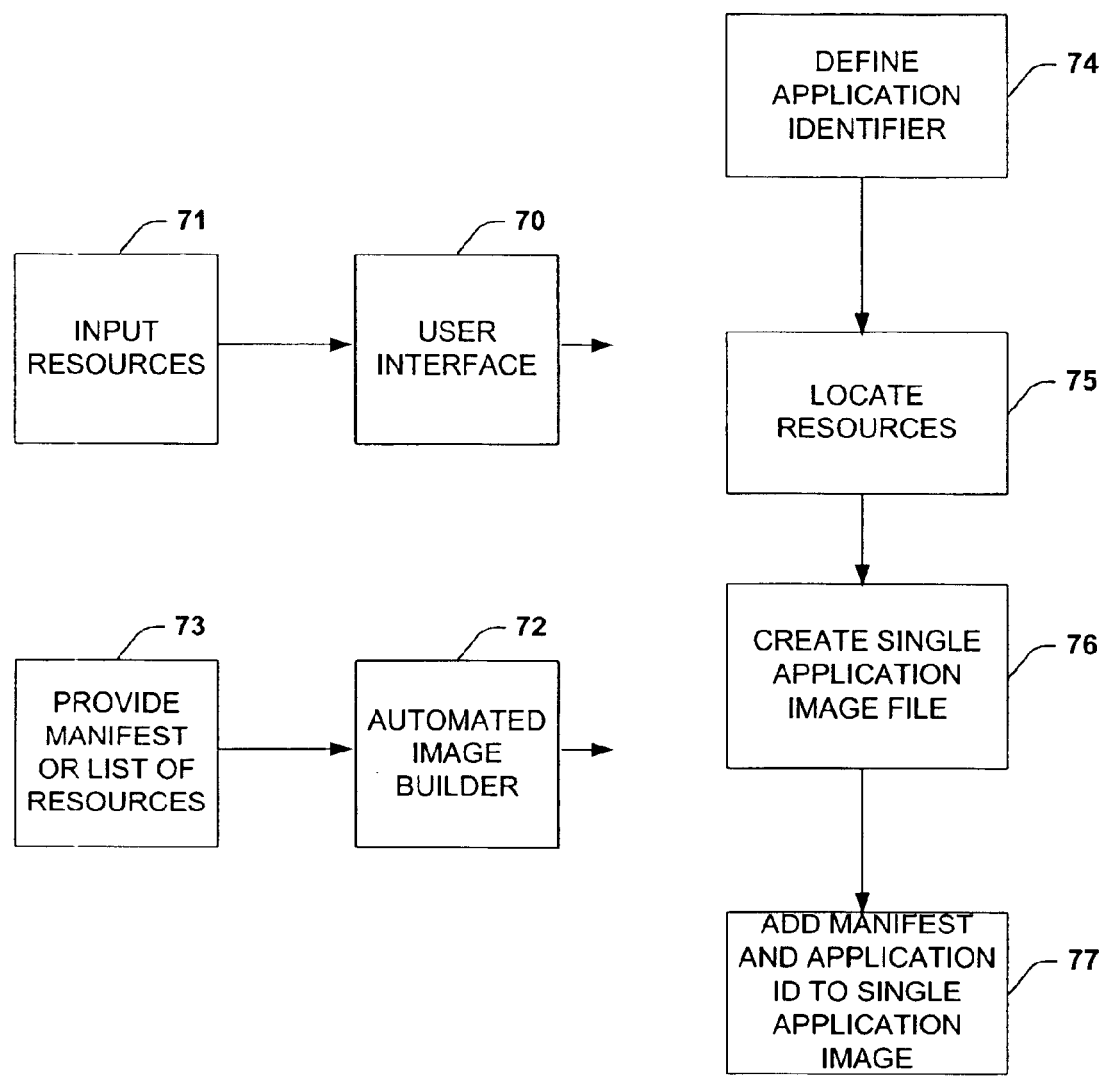
FIG. 4 is a flow diagram that illustrates creating a singular application image in accordance with an aspect of the present invention.

FIG. 4 illustrates a methodology for providing a single application image in accordance the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Before proceeding with the methodology of FIG. 4, two alternate systems are depicted for creating a single application image. For example, a user interface 70 can be provided that receives input from a user at 71 directing which resources should be combined into the single application image. At 72, an automated image builder can be provided, wherein the image builder inputs a manifest or list of resources 73 and creates a single application from the list 73. The automated builder 72, for example, can conduct a search for the listed resources and provide a resource ID mapping within the single application image along with providing an automatically generated application identifier.

Proceeding to 74, an application identifier such as a GUID is defined for a single application image. It is noted that other techniques can be utilized for identifying a application image in accordance with the present invention such as a Universal Resource Identifier (URI) and a Universal Resource Locator (URL), (e.g., \\machine\applications\applicationName or \\entity\applications\applicationName). At 75, resources for the image are located. As described above, these resources may be manually defined via a user interface and/or automatically located via an image builder, for example. At 76 a file is created that will include the single application image. At 77, a manifest containing resource identifiers located at 75 and the application ID created at 74 are directed to the application image created at 76 in order to create the single application image.

Figure 5:
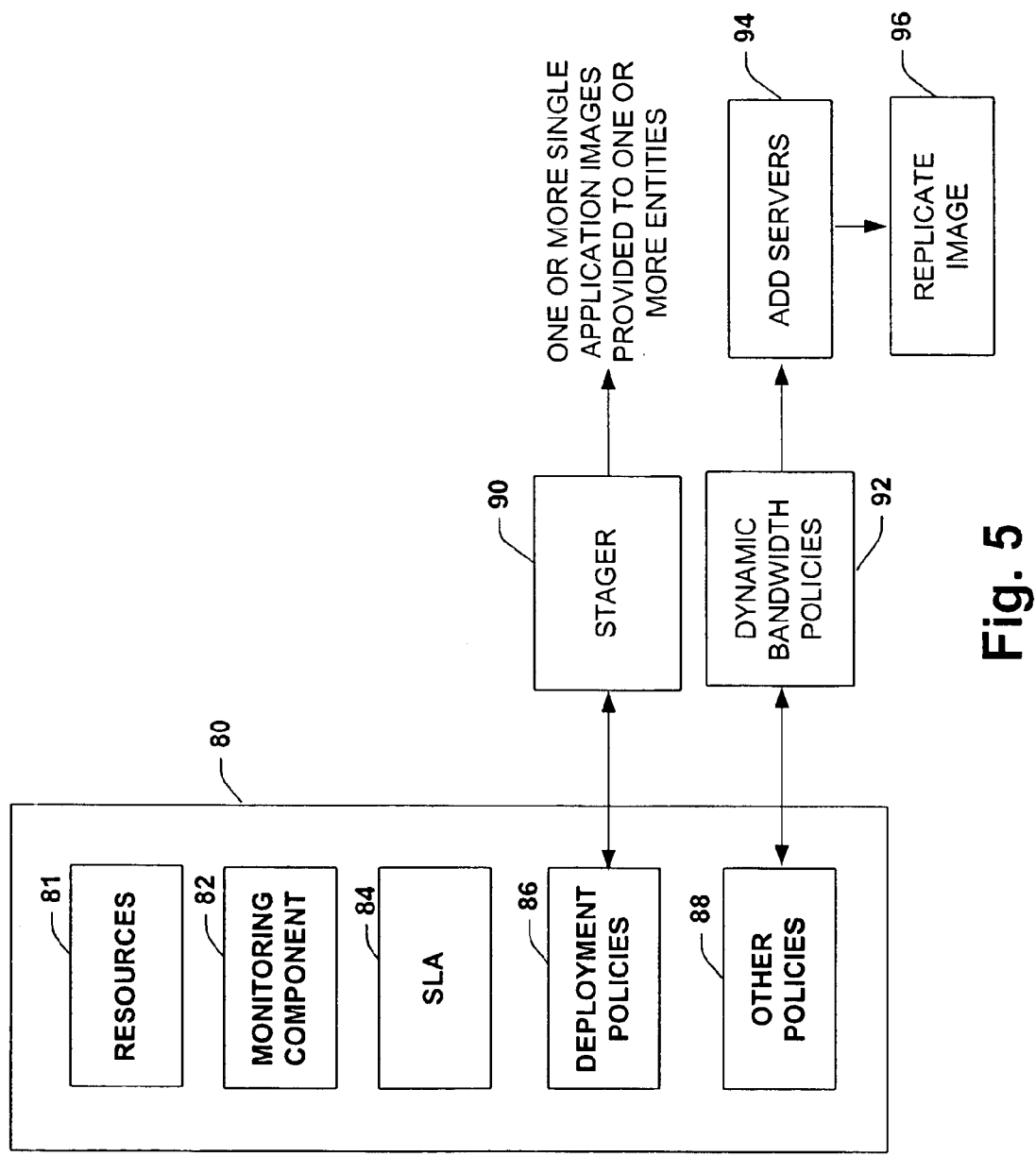
FIG. 5 is a diagram illustrating other aspects of a singular application image in accordance with an aspect of the present invention.

Proceeding to FIG. 5, various aspects of the single application image are illustrated. A single application image 80 is illustrated and can include one or combinations of one or more resources 81, a monitoring component 82, a service level agreement (SLA) 84, a deployment policy 86 and/or other policies 88. The monitoring component 82, which can be bound to the image manifest is provided for display and administration of the resources within the image 80. These functions include enumerating the resources in a flat and/or hierarchical manner depending on the physical/logical relationships between the various resources. The SLA 84 can include policies for managing the lifetime of the image 80. For example, this can include providing rules or policies that describe that an associated application can only execute during certain periods and/or times. These policies can also affect how long an application may exist on a machine, for example. After a certain time period, the application can alert the system and/or remove itself from an operating environment based upon the policy.

The deployment policies 86 can include rules of deployment within the image 80. For example, a stager 90 may execute the image 80 as a trial before deploying the image to other members of an entity. The deployment policies 86 can thus dictate where the application can reside. Thus, the stager 90 can observe the policy and determine which members of the entity should receive the associated image based upon the rules provided in the deployment policy 86. As another policy example, a dynamic bandwidth policy 92 can be provided. These policies can include executables that determine the amount of usage and/or load that is required of an application. It is to be appreciated that other policies 86/88 can be provided (e.g., how the application 80 is to be deployed (e.g., what optional behaviors there should be), what resource mappings there should be per deployment, when the deployment occurs, and/or who can deploy the application 80).

When the image 80 is executing, it can determine that more or less server resources 94 are required to service a desired/determined application load. This can also include replication policies 96 for distributing the application to servers. In this manner, the image can regulate the amount of load by increasing and/or decreasing the servers that the application utilizes to distribute load.

Figure 6:
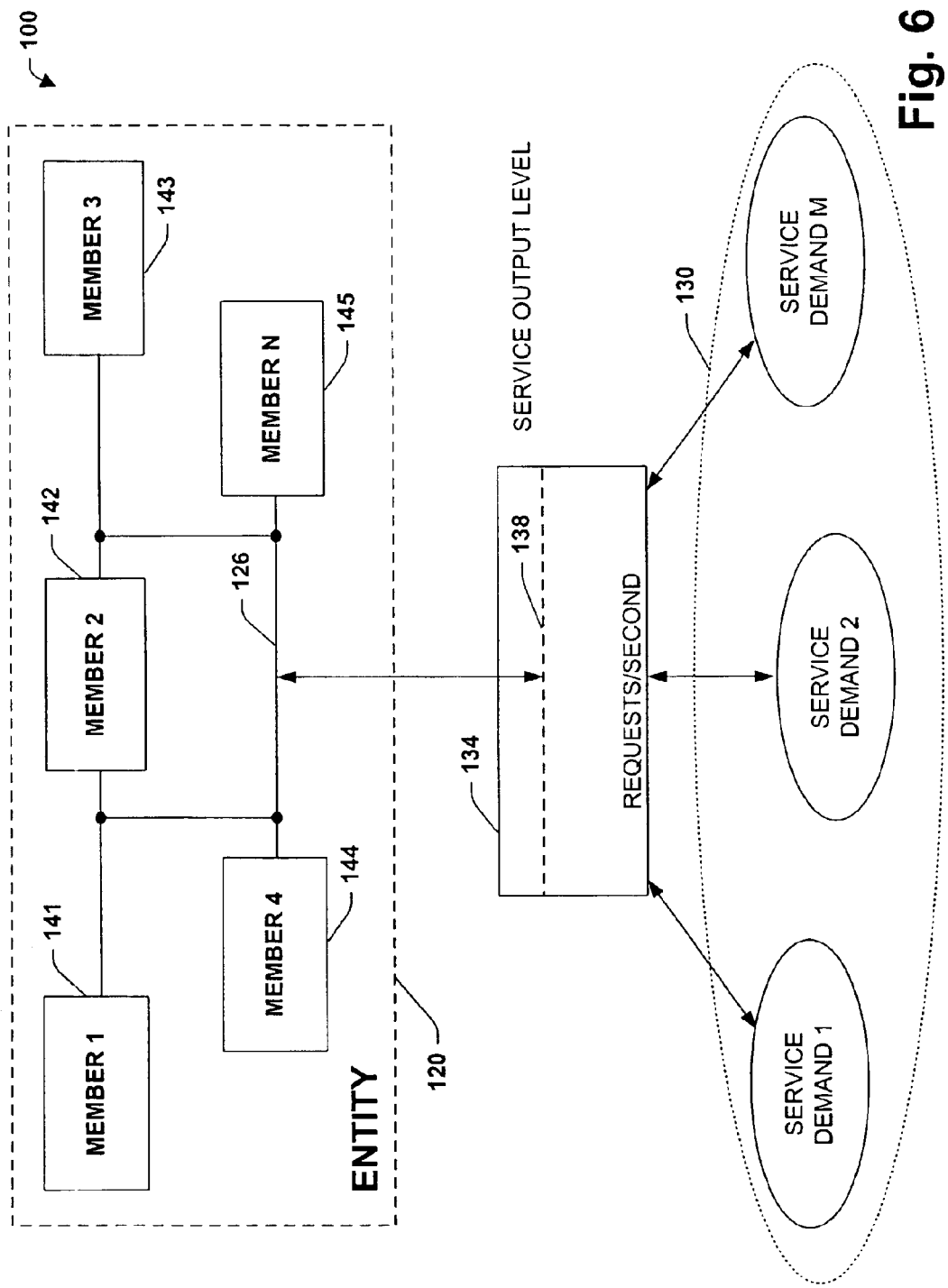
FIG. 6 is a schematic block diagram illustrating an entity for providing network services in conjunction with single application images in accordance with an aspect of the present invention.

FIGS. 6 through 9 illustrates a distributed computing environment in which the single application image of the present invention can be utilized. Referring to FIG. 6, an exemplary system 100 illustrates an aspect of a virtual applications architecture in which a single application image can be employed in accordance with the present invention. An entity 120, which may be operatively coupled to a network 126, such as the Internet, LAN, and/or WAN responds and services incoming service requests from a plurality of demand sources 130. The demand sources 130 may be received world-wide and thus, collectively provide a network load 134 which may be determined, for example, as the number of network requests received per second by the entity 120. As illustrated, a service level 138 may be provided by the entity 120 to supply the demand load (e.g., millions of requests/second) at points in time. As will be described in more detail below, the virtual applications architecture enables the entity 120 to respond/service the load 134 and to facilitate a desired service level 138.

The entity 120 may include a plurality of members 1 through N (N being an integer 1, 2, . . . ) 141–145, hereinafter referred to as the members 141–145, cooperating to service the load 134. The members 141–145 may be computer/server systems adapted to communicate to the network 126, for example, and may be scaled by adding and/or removing members to service larger and/or smaller loads 134. For example, the entity 120 may include members 141 through 145 for serving "X" requests/second, and include additional members (not shown) for serving larger loads 134 than X. As will be described in more detail below, members 141–145 and associated resources may be dynamically added to/removed from the entity 120 via a service level agreement according to dynamic changes in the load 134 and to facilitate a desired service output level 138.

Figure 7:
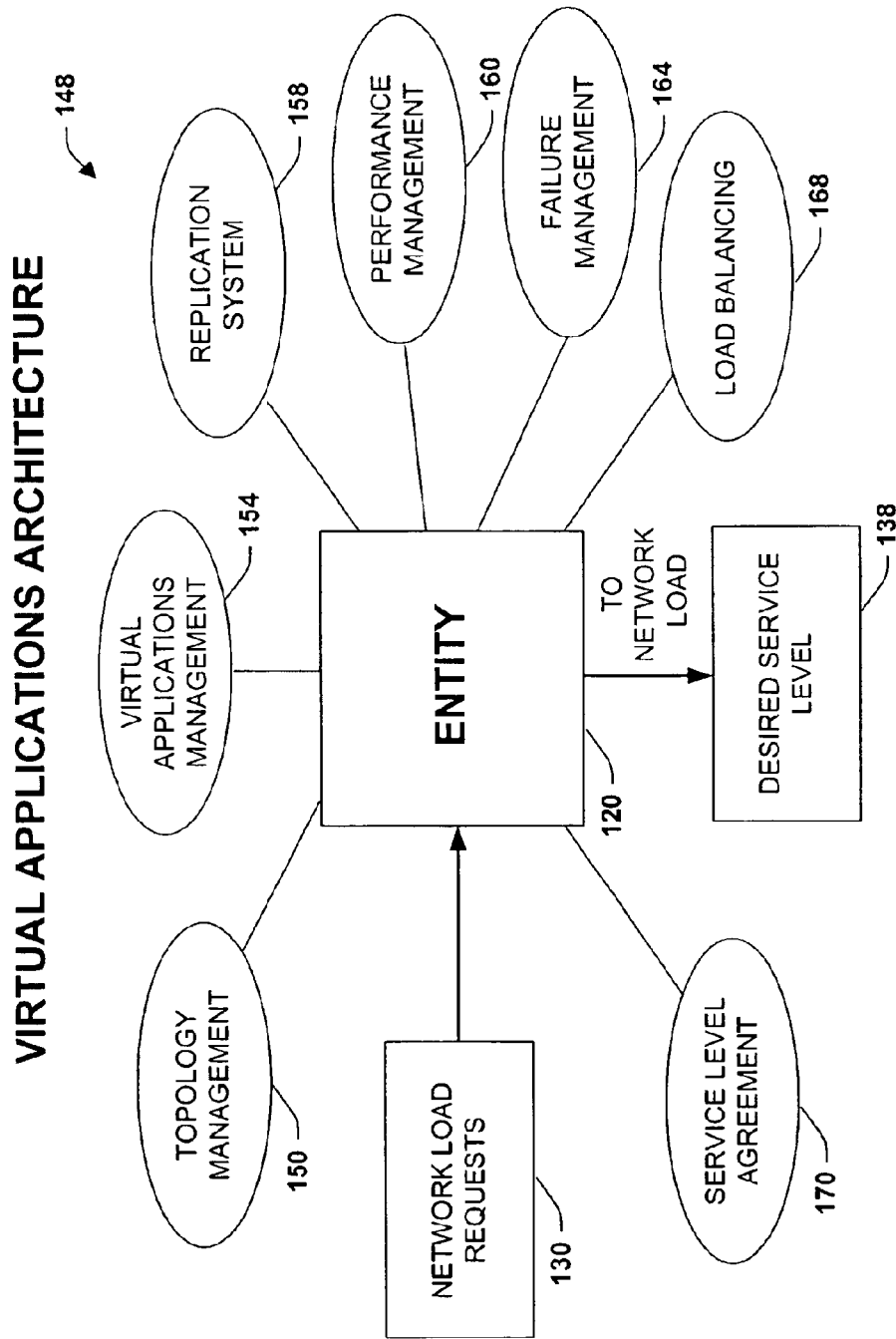
FIG. 7 is a schematic block diagram illustrating a virtual applications architecture in conjunction with single application images in accordance with an aspect of the present invention.

Turning now to FIG. 7, an exemplary system 148 illustrates a virtual applications architecture in accordance with the present invention. The virtual applications architecture enables the entity 120 to receive a plurality of network requests 130 and provide a desired service level 138 based upon the requests 130. The entity 120 may include a topology manager 150, a virtual applications manager 154, a replication system 158, a performance management system 160, a failure management system 164, a load balancing system 168, and a service level agreement 170.

The topology manager 150 facilitates member cooperation and synchronization within the entity 120. This may be achieved, for example, by determining if the members (not shown) are in agreement with the virtual applications manager 154 which contains a master copy of content (e.g., applications, configurations, registry settings, components, executables, DLL's, directories, files, etc.) to service the network requests 130. If the topology manager determines that a member does not agree with the master copy, a content replication may be initiated by enabling the replication system 158 to update the member with suitable content, such as one or more single application images (not shown) to service desired loads. This may be achieved, for example, by setting a flag to enable the replication system 158. By updating members according to the virtual applications manager 154, synchronization with the topology manager 150 may be achieved. It is noted that the entity 120 may be homogeneously and/or non-homogeneously configured. For example, in a homogenous configuration, replication of similar content may occur to all members within the entity 120. In a non-homogenous configuration, some members may be configured dissimilarly from other members based upon system requirements.

According to another aspect of the present invention, the performance management system 160 may be included to facilitate monitoring and administration of the entity 120. Members may log events related to member performance and provide the logs to a plurality of data stores. From the data stores, performance may then be aggregated to determine performance of the entity 120. In this manner, a determination may be easily made by an administrator whether or not the entity 120 provides the desired service level 138. Moreover, troubleshooting and failure detection are facilitated by aggregating member performance wherein the administrator may rapidly determine from the logs which portion of the entity 120 may be malfunctioning. This is in contrast to conventional systems wherein individual members may have to be searched independently and manually by the administrator thereby expending valuable time and resources.

According to yet another aspect of the present invention, the failure management system 164 may be provided to cause entity 120 actions to occur based upon predetermined rules. For example, a monitor may be set up to receive and measure the events described above. If the number and/or type of event exceeds a predetermined rule (e.g., threshold) for the event, the topology manager 150 may be alarmed to take corrective action. The corrective actions may include for example, notifying an administrator, taking a member out of service, bringing a new member into the entity 120 and a plurality of other actions relating to service and administration of a computer system. In this manner, a desired service level 138 may be maintained.

Relating to failure management, system reliability and redundancy, the load balancing system 168 may be provided to distribute network requests 130 to the members of the entity 120. Load balancing facilitates the entity 120 reliability by distributing network requests 130 to contributing members of the entity 120. For example, if member 2 (Ref. 142 in FIG. 6), were to fail, the load balancing system 168 may distribute the network requests previously being routed to member (2) to other members in the entity 120. In this manner, the desired service level 138 may also be maintained and system reliability increased.,.

According to yet another aspect of the present invention, the service level agreement 170 may also be provided to facilitate entity 120 performance and/or vary the desired service level 138. The service level agreement 170 may provide rules for the topology manager 150 to determine and adjust the service level 138. For example, some of the entity members may be enabled at certain times of day (e.g., via a timer within the topology manager)— if so desired. This may be advantageous for example during peak Internet activity periods in a day. Another rule may cause the topology manger 150 to enable/disable members based upon the amount of network requests 130. Still yet another rule may enable members to participate based upon the origin of the requests 130. For example, member 4 shown in FIG. 6, may become enabled during requests originating from Europe and/or Japan. It is to be appreciated that a plurality of other rules may be developed for adjusting the desired service level 138.

Figure 8:
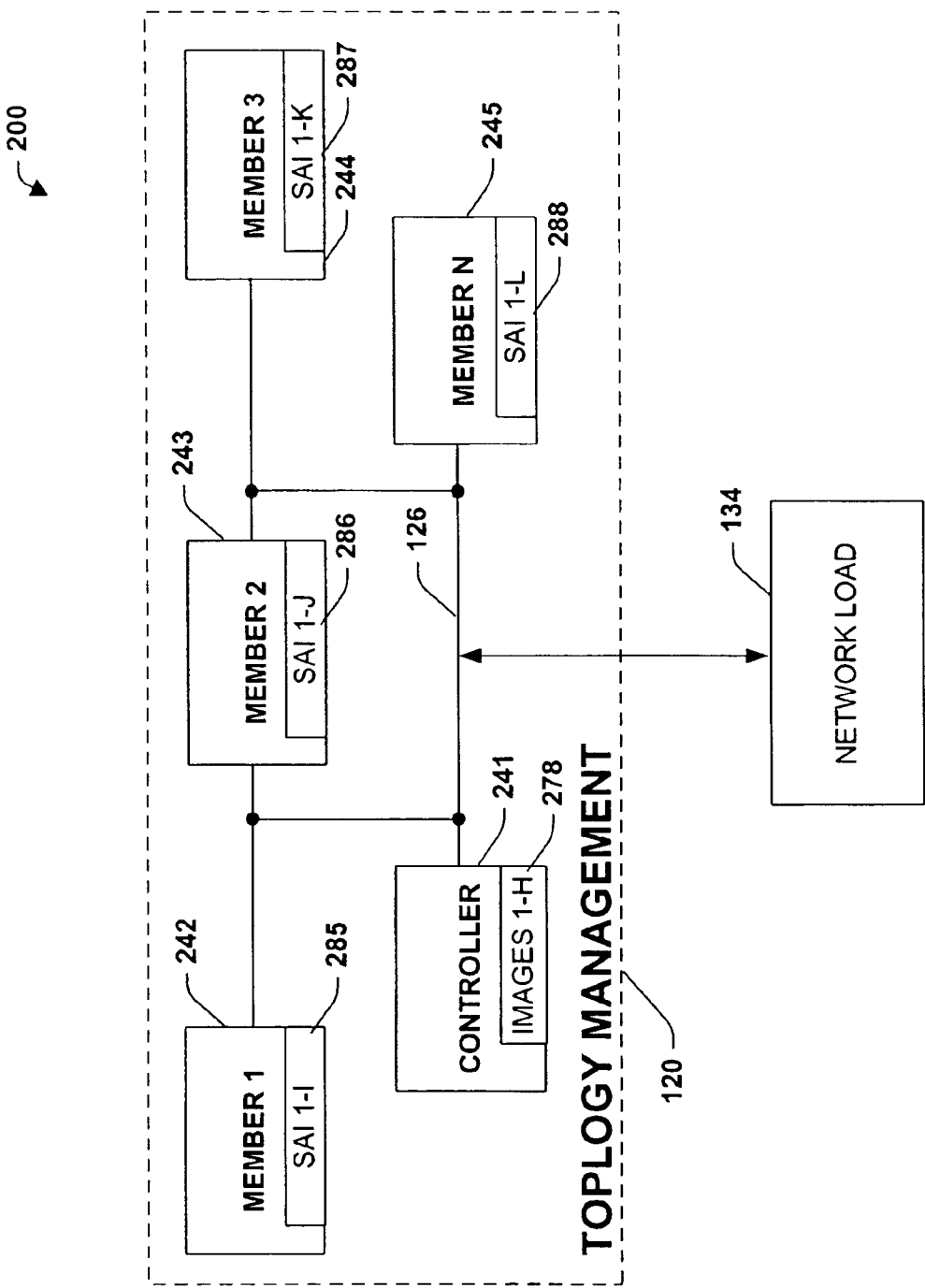
FIG. 8 is a schematic block diagram illustrating topology and virtual applications management in conjunction with single application images in accordance with an aspect of the present invention.

Referring now to FIG. 8, an exemplary system 200 illustrates a topology and virtual applications management system. According to an aspect of the present invention, a controller 241 may be designated (e.g., selected by an administrator, elected by entity rules—described below) to provide topology management wherein applications may be managed and scaled across the entity 120 to service a network load 134. Virtual applications management may be provided by one or more single application images 278 within the controller 241, for example. The images 278 which can be maintained in a storage (not shown), such as a database, and may include resources, as described above, defining the applications designated for deployment throughout the entity 120. As will be described in more detail below, the images 278 may be deployed by a replication system (not shown) in order to automatically configure respective members to service the network load 134. Thus, individual manual configuration and applications deployment as associated with conventional systems is substantially improved by the present invention.

The resources defined in the images 278 may include the desired resources to enable a Web site and/or distributed component (e.g., COM+) application, for example, to function on a member 242–245. An exemplary set of applications resources may include Web site applications with associated directory names, configurations and paths relating to the application. Associated registry settings for configuring members to run the applications may also be included. Other resources may include files, folders, and/or other associated directories for enabling an application to be deployed and execute on a member. It is to be appreciated that other data and executables as are well understood may also be included in the images 278.

After an application has been defined in the images 278 and deployed to the members 242–245 and depicted as one or more single application images 285–288 on the members, the entity 120 may begin to service requests from the network load 134. The controller 241 may periodically communicate with the members 242–245 to determine if the deployed images 285–288 correlate to the images 278 within the controller. In this manner application content associated with the members may be synchronized with the controller 241. For example, if a new member has been added to the entity 120, the controller 241 may manage the new entity topology by determining which images in the new member do not match those defined in the controller images 278. This may achieved, for example, by providing a list of associated images (described below) from the controller 241 to the member having the member request resources appearing on the list which the member does not have, and deploying images from the controller 241 to the requesting member.

Although topology management has been described in terms of a singular controller 241, it is to be appreciated that alternative topology management schemes may be selected for the entity 120. For example, each member 241–245 associated with the entity 120 may contain one or more images for defining an application. If a user/administrator were to update any member with new applications content, the new content may be deployed from that members respective images to other members of the entity 120 during a designated update period, for example (e.g., setting a flag alerting all members to receive new content). Synchronization of application content may be alternatively achieved, for example, by employing a voting arrangement during non-update periods (e.g., flag described above is reset) wherein each member publishes a list of what is believed to be the correct applications content. For example, if eight of nine members agree on the content, then minority voting members may be updated from any majority voting member. Another arrangement can include merging the differences between members by a set rules and/or user intervention to facilitate that the servers in the entity (topology) have similar content.

Referring back to the singular controller 241 of FIG. 8, the controller 241 generally provides the authoritative copy of content and configuration information for the entity 120. Members may be kept synchronized with the controller 241, both in terms of entity-related configuration and content. Entity-wide changes (either configuration and/or content), therefore, should be applied through the controller 241, and generally should not be applied while the controller 241 is unavailable (e.g., failed).

Figure 9:
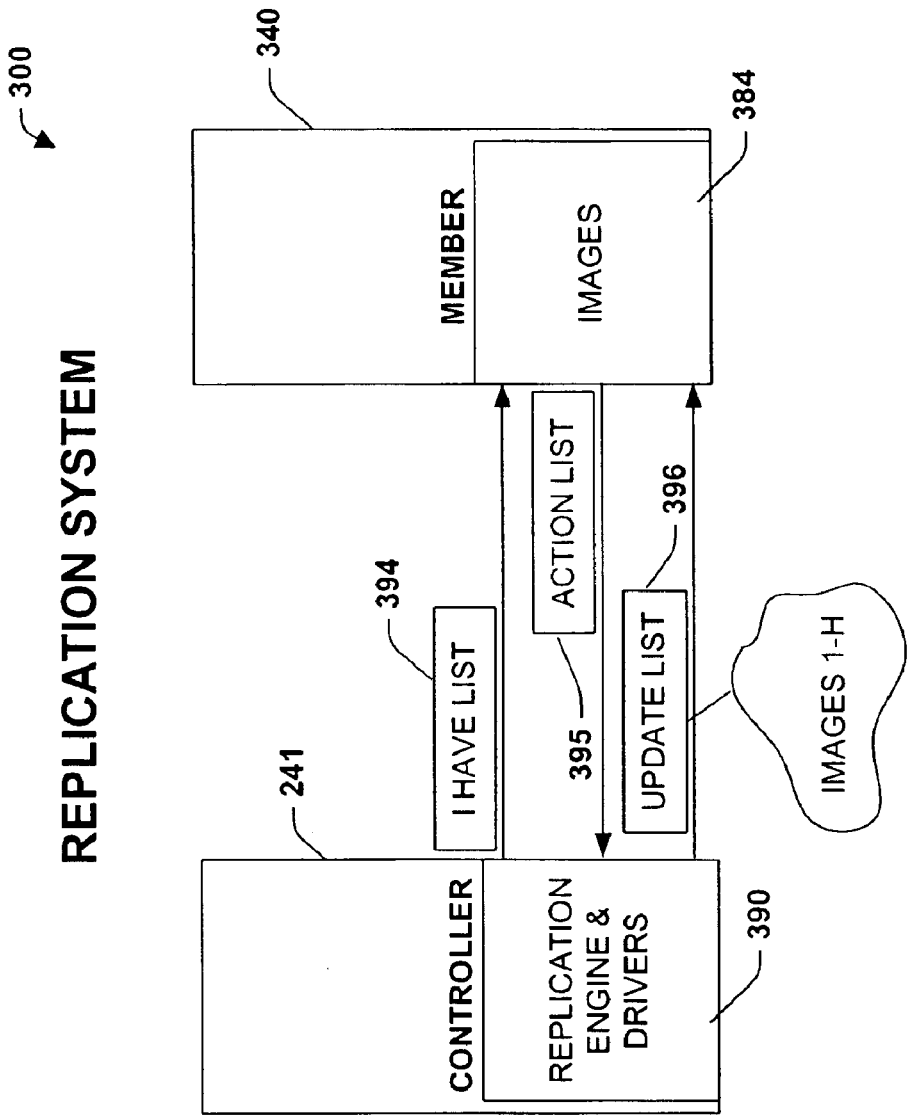
FIG. 9 is a schematic block diagram illustrating a replication system in accordance with an aspect of the present invention.

Referring now to FIG. 9, an exemplary system 300 illustrates a replication system in accordance with an aspect of the present invention. Although replication is depicted between the controller 241 and a single member 340, it is to be appreciated that the controller may replicate applications to all members of the entity. A two level architecture may be provided including a Replication Engine and Replication Drivers 390 to propagate virtual applications to/from entity members 340. For example, there may be a replication driver for each content type (e.g., Files, Metabase settings, COM+components, CAPI items, and registry settings (DSNs), etc.). The drivers may be responsible for reading and writing content type, wherein the replication engine may be responsible for coordinating replications among drivers, error recovery, and transport. Lists 394–396 (e.g., XML) may be provided to facilitate communications and replication to the members 340. For example, the lists 394–396 may include: an IHaveList (e.g., signature list) 394, an ActionList (e.g., request for updated content) 395, and an UpdateList (e.g., updated content—may contain pointers to external storage instead of actual content) 396.

The replication system 300 may operate in a plurality of modes to propagate changes throughout the entity. For example, an Automatic mode may be provided which enables updates to occur when new content has been provided to the controller 241. Also, there may be a Full Synch mode, which may run a content check of resource items against members to facilitate fidelity of member content. The Full Synch may be started manually (e.g., set flag) by the user and may also run periodically to facilitate that the members are in synchronization. During an automatic update, a full synchronization may also occur to facilitate fidelity of content. When a Full Synch occurs, the Replication Engine may call the drivers and command the drivers to search a namespace (not shown) (e.g., files and directories specified for the application, the metabase, user specified DSNs, etc.) on the controller 241 and compare the namespace with each member. The differences between the controller 241 and individual members 340 may then be sent to the member and applied.

When changes are made to the controller 241 and automatic replication is enabled as described above, the replication system 300 may detect the change and replicate it. For example, the replication engine 390 may listen to notifications from the replication drivers for changes. When a change is detected, these changes may be sent to the members in the entity, then applied via the Lists 394–396 described above, for example.

During a Full Synch replication, the IHhaveList 394 may be sent to the member 340 from the controller 241. The member may then check its own content and reply with the ActionList 395 that requests the changes needed. The controller 241 may then respond with the UpdateList 396 providing the information requested for that update. During an Automatic replication, the Replication Engine 390 may send UpdateLists 396 to the target members informing them of changes as they occur on the controller 241. For example, the UpdateList 396 may be an application image providing an XML blob that describes what the update is, what data is being updated, and the actual update—if desired. There may be an ACTION parameter (not shown) that describes how the updated item should be handled during automatic updates. For example, the parameter's value may be SET to update and/or change an existing item, DEL to delete an existing item, and/or ADD to create a new item.

Referring now to FIGS. 10–16, a graphical user interface is illustrated for creation, deployment and enumeration of a single application image in accordance with the present invention. The single application image, as described above, combines several discrete resources into a single entity. FIGS. 10–16 provide a user interface for management of the single application image. The number of various resources that define an application can be large. Thus, the present invention provides an enumeration user interface (UI) for defining and managing the image. The single application image can be represented as a single entity via the UI that can also provide actions to be performed on the application. For example, wizards can be provided that simplify performing administrative tasks on one or more single application images.

Figure 10:
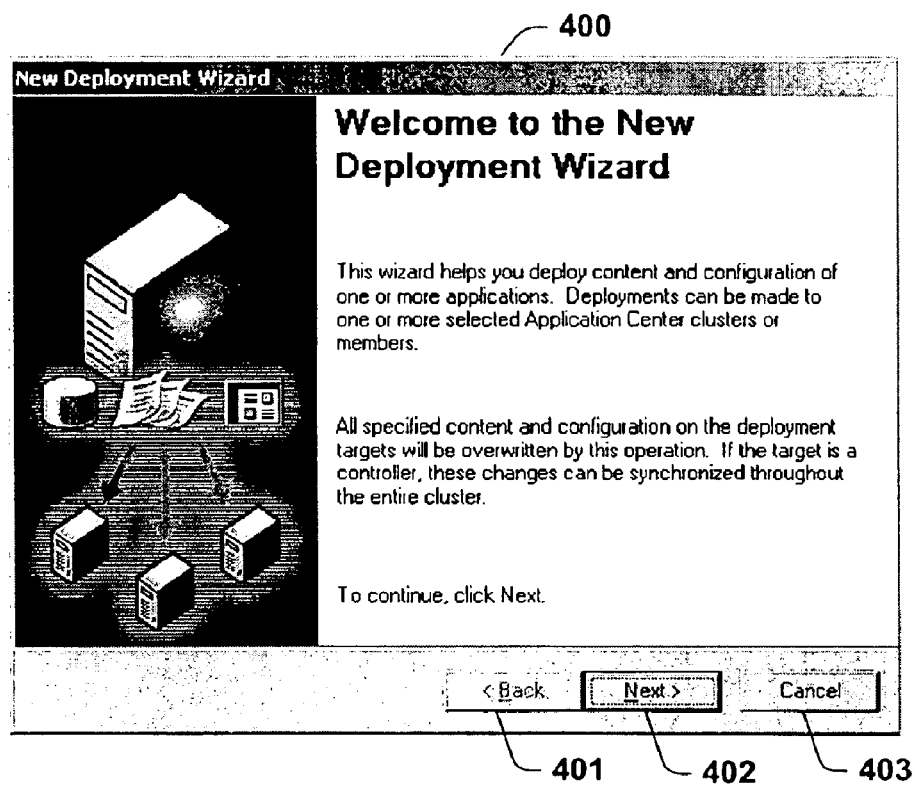

Referring to FIG. 10, a deployment wizard 400 is provided for deploying single application images within members or between members of an entity. It is noted that the deployment wizard 400 is not limited to deployment between members, entities and/or homogeneous systems, but can include non-homogeneous systems and/or other systems, members and entities. Thus, the wizard 400 can be utilized to deploy the single application image to substantially any system adaptable to the single application image format as described above. The deployment wizard 400 may include a sequence of related and/or optional interface objects that can include output display and input capabilities. This can also include a back 401, a next 402, and a cancel input 403 for controlling the sequence of the deployment wizard 400. For example, if the next input 402 is selected, interface objects 410 and 412 can be displayed as depicted in FIG. 11. Object 410 includes selections for deploying content within an entity such as a cluster, or to deploy content outside the entity. A deployment name input field can also be included. Object 412 includes inputs for supplying administrative credentials such as a source authentication. This can include inputs for a username, password and a domain name, for example.

Referring to FIG. 12, an interface object 414 provides similar input fields to the object 412 in FIG. 11, however, these authentication fields are directed to the targets for deployment of the single application image. An interface object 416 provides options for deploying the images to all members of a target entity such as a controller or for deploying content to selected members. A display 418 can be provided to enumerate the members and/or entities for deployment.

Referring now to FIG. 13, an interface object 420 is provided for selecting one or more targets for deployment of one or more application images. This can include providing a browse, add, and remove button for selecting the desired targets of multiple application images. For example, an object 424 depicts three exemplary applications 426 for potential deployment to the target. It is noted that other applications may be similarly displayed and deployed. The object 424 also provides selections for deploying all applications 426 of the entity or for deploying selected applications 426 of the entity. An object 428 provides for enabling deployment options such as replicating resource permissions, resetting services, and/or other settings that can influence application availability.

Referring to FIG. 14, an interface object 430 provides for drain options with an associated deployment. This can include providing selections for resetting connections immediately, or resetting connections according to a drain time setting configured for the target. A completion object 432 can be provided to signal that the deployment wizard has been configured and signal that the deployment process has been completed. It is noted that the wizard 400 can "create" the deployment which is then executed by the system in which it exists. Thus, the deployment does not necessarily have to execute immediately. It is possible to specify a schedule for deployments, for example, and/or treat the deployments as temporary (e.g., run a set number of times) and/or persistent (e.g., remain in system until manually removed).

Figure 15:
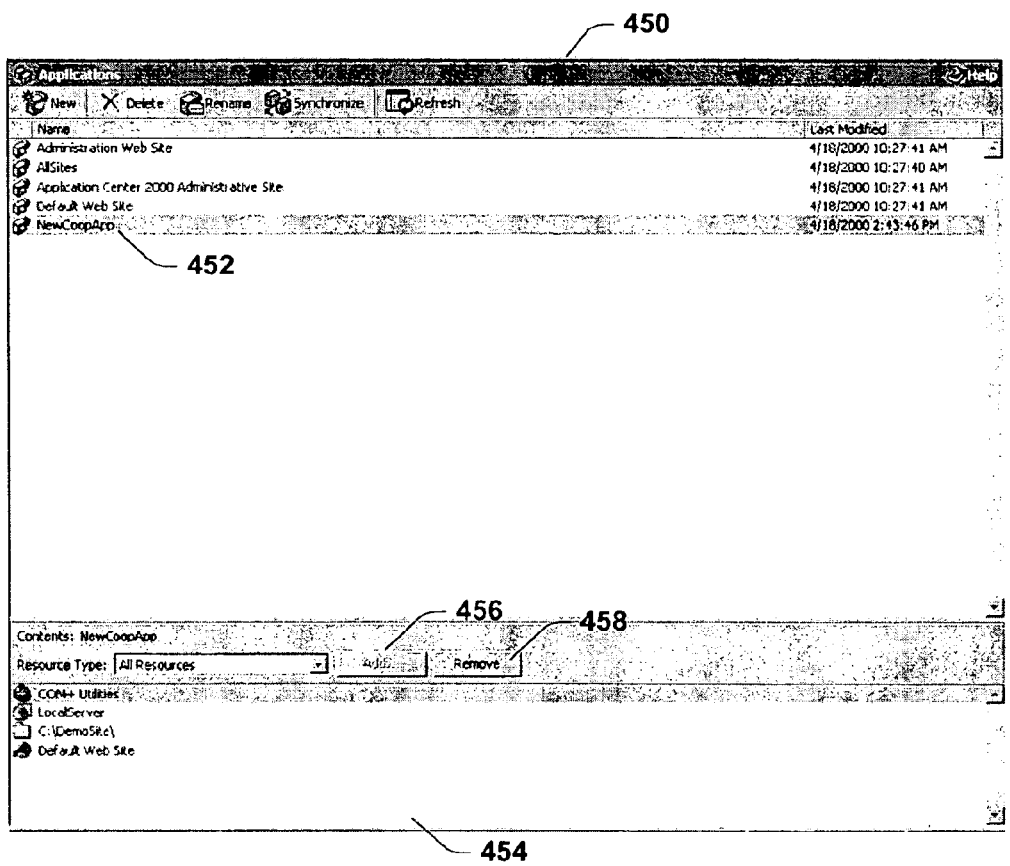
FIG. 15 is a graphical user interface illustrating enumeration and viewing of a singular application image in accordance with an aspect of the present invention.

Referring to FIG. 15, an enumerated display 450 is provided for viewing and administrating single application images in accordance with the present invention. For example, a single application image is selected at reference 452. A display window 454 displays the associated resources of the image selected at 452. As illustrated in FIG. 15, the resources of the selected application can include executable components, registry keys, database server connections, directory structures, and/or web site definitions. It is noted that these resources are exemplary and that a plurality of other types of resources may be similarly included as described above. It is further noted that the resources may be displayed in a flat and/or hierarchal manner, wherein some of the resources are displayed at a similar level and/or some of the recourses are displayed in a hierarchal directory subdirectory relationship. Furthermore, resources can be enumerated in substantially any manner. For example, the present invention is not limited to flat and/or hierarchal enumerations.

Substantially any resource browser can be utilized to select the resources to be included. Also, the present invention can be adapted to enumerate recursively (e.g., whereby including one resource also includes other resources that are dependent). Additionally, add and remove inputs 456 and 458 may be included for adding and removing selected resources from selected application images. FIG. 16 provides interface objects 460 and 464 for adding resources to a web page dialog application, for example. The object 460 depicts a plurality of recourses in a display 462 associated with an entity. The object 464 depicts system file paths such as drive selections that can be included within the application image.

Figure 17:
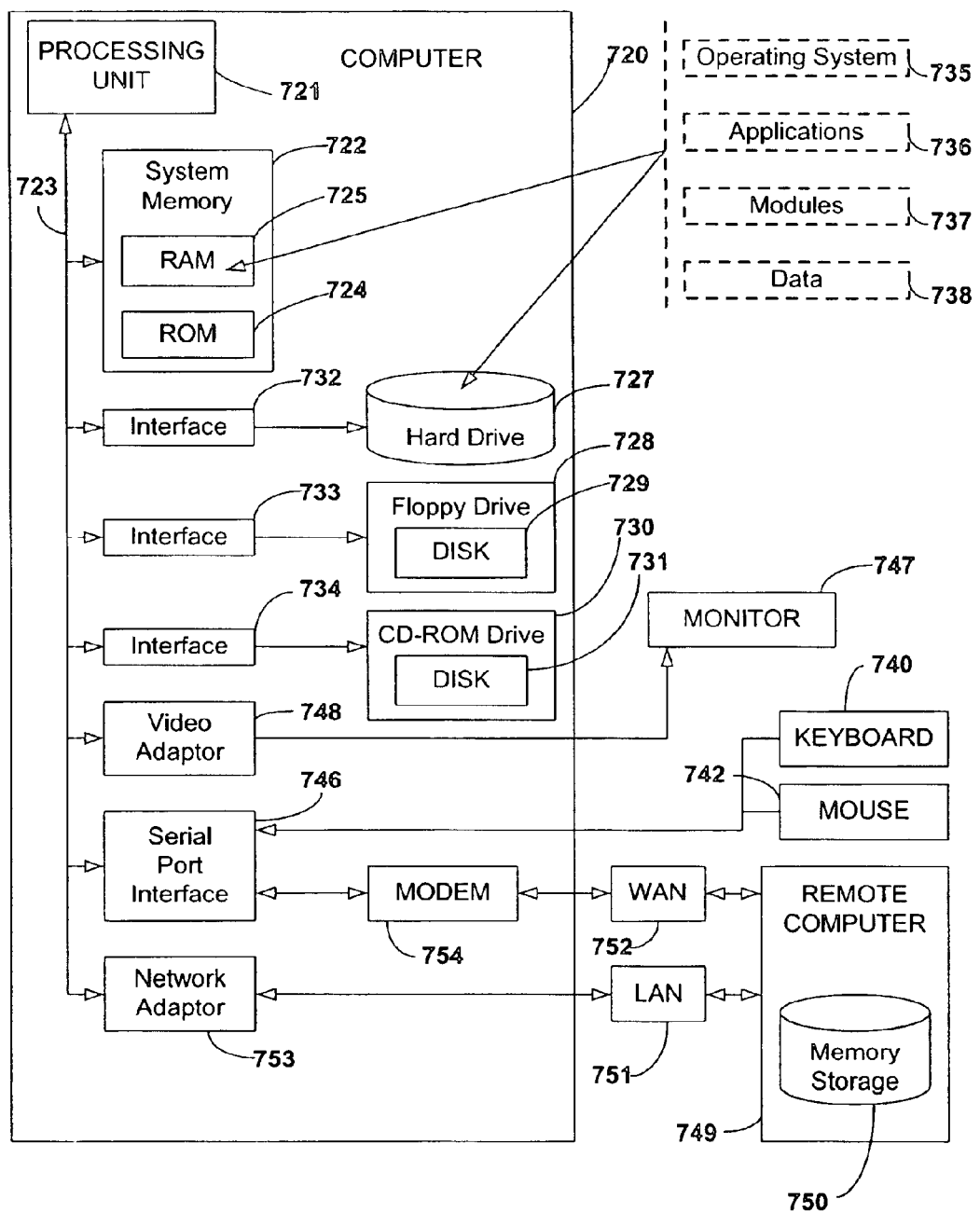
FIG. 17 is a schematic block diagram illustrating a suitable operating environment in accordance with the present invention.

In order to provide a context for the various aspects of the invention, FIG. 17 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 17, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected 21 by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 17. The logical connections depicted in FIG. 17 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations and variations that fall within the spirit and scope of the appended claims.

What is claimed is:

1. A system that facilitates the administration of an application, comprising:
   a resource identifier that identifies resources associated with the application;
   a manifest that logs the resources; and
   an aggregator that aggregates a subset of the resources into one or more application images to facilitate administration of the application.

2. The system of claim 1, wherein the aggregator is at least one of a user interface and an automated builder.

3. The system of claim 1, further comprising an application identifier to identify the resources as a collection.

4. The system of claim 3, wherein the application identifier is a globally unique identifier (GUID).

5. The system of claim 1, wherein the manifest is at least one of consumable and manageable in order to facilitate administration of the application.

6. The system of claim 1, wherein the resources are at least one of a data structure, configuration file, directory, directory substructure, pointer, identifier to other images, objects and code image.

7. The system of claim 6, wherein the resources are at least one of organized, executed, operated upon, and enumerated in at least one of a flat and hierarchical manner.

8. The system of claim 1, wherein the application images are nested into one or more subsequent application images.

9. The system of claim 1, further comprising an existing application that is extended by including one or more new components into the one or more application images.

10. The system of claim 1, further comprising at least one of a monitoring component, a service level agreement (SLA), a deployment policy, and a bandwidth policy.

11. The system of claim 10, wherein the monitoring component provides an enumerated display of the resources, the enumerated view including at least one of a flat or hierarchical display of the resources.

12. The system of claim 10, wherein the service level agreement provides rules for at least one of the operation, execution, and lifetime of the application.

13. The system of claim 10, further comprising a stager that utilizes the deployment policy to configure one or more application images to be deployed.

14. The system of claim 13, wherein the deployment policies determine a location where the one or more applications are deployed.

15. The system of claim 10, wherein the bandwidth policy enables an application to determine available resources.

16. The system of claim 15, wherein the bandwidth policy enables the application to monitor the application utilization and regulate the amount of available resources executing the application in accordance with the application utilization.

17. The system of claim 1, wherein the resources are mapped to corresponding system resources.

18. A method to facilitate administration of an application, comprising:
   defining an application identifier;
   locating one or more resources associated with the application; and
   combining the one or more resources and the application identifier into an application image.

19. The method of claim 18, wherein the application identifier is a globally unique identifier.

20. The method of claim 18, further comprising replicating the application image to one or more members.

21. The method of claim 18, further comprising nesting the application image into a subsequent application image.

22. The method of claim 18, further comprising extending the application image by combining a subsequent component with the application image.

23. The method of claim 18, further comprising operating upon the application image in at least one of a flat and a hierarchical manner.

24. The method of claim 18, further comprising combining the one or more resources into a manifest.

25. The method of claim 18, further comprising associating at least one of a monitoring component, a service level agreement, a deployment policy, and a bandwidth policy with the application image.

26. The method of claim 25, wherein the at least one of the monitoring component, the service level agreement, the deployment policy, and the bandwidth policy are included within the application image.

27. A computer-readable medium having computer-executable instructions for performing the acts of claim 18.

28. A system to facilitate administration of an application, comprising:
   means for assigning an identity to an application;
   means for locating a plurality of components associated with the application; and
   means for combining the plurality of resources and the identity into an application image.

29. A computer-readable medium having stored thereon, an application image, comprising:
   one or more resource identifiers configured in at least one of a flat and hierarchal arrangement between the one or more resource identifiers;
   a manifest to group the resource identifiers; and
   an application identifier to associate the resource identifiers and the manifest within the application image.

30. A signal to communicate an application image, comprising:
   a signal to communicate data; and
   an aggregated application image, the aggregated image including a plurality of resources defined in a manifest, the aggregated image identified by a globally unique identifier, wherein the aggregated application image is communicated via the signal between members of at least one of a local, remote, and wireless system.

31. A graphical user interface, comprising:
   one or more interface objects associated with an aggregated application image, the aggregated application image including at least one of a resource identifier and an application identifier associated with the at least one resource identifier, the one or more identifier objects facilitating at least one of deployment, creation, deletion, and enumeration of the aggregated application object.

32. The graphical user interface of claim 31, further comprising a deployment wizard to distribute the aggregated image between members of an entity.

33. The graphical user interface of claim 32, wherein the deployment wizard further comprises target options for deployment of the aggregated image.

34. The graphical user interface of claim 33, wherein the deployment wizard further comprises at least one of a deployment name and a selection for deploying the aggregated image inside and outside of the entity.

35. The graphical user interface of claim 32, wherein the deployment wizard further comprises a deployment source authentication that includes at least one of a user name, a password, and a domain.

36. The graphical user interface of claim 32, wherein the deployment wizard further comprises a deployment target authentication that includes at least one of a user name, a password, and a domain.

37. The graphical user interface of claim 32, wherein the deployment wizard further comprises a selection for which members of the entity to deploy the aggregated image.

38. The graphical user interface of claim 32, wherein the deployment wizard further comprises options for deploying the aggregated image to all members of the entity.

39. The graphical user interface of claim 32, wherein the deployment wizard further comprises providing a selection for which on one or more aggregated images are to be deployed.

40. The graphical user interface of claim 32, wherein the deployment wizard further comprises at least one of permissions options, reset options, draining options and filter options.

41. The graphical user interface of claim 32, wherein the interface objects further comprises a selectable display to enumerate one or more aggregated images.

42. The graphical user interface of claim 41, wherein the selectable display further comprises providing a selection of the one or more aggregated images to enumerate the resources within the one or more aggregated images in at least one of a flat and a hierarchal manner.

43. The graphical user interface of claim 41, wherein the selectable display further comprises selections to at least one of add and remove resources from the aggregated image.

* * * * *